(12) United States Patent
Duffield

(10) Patent No.: US 12,320,681 B2
(45) Date of Patent: *Jun. 3, 2025

(54) LINEAR ROTARY ENCODER

(71) Applicant: ELECTRONICS FOR IMAGING, INC., Londonderry, NH (US)

(72) Inventor: John Peter Duffield, Stratham, NH (US)

(73) Assignee: ELECTRONICS FOR IMAGING, INC., Londonderry, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/654,824

(22) Filed: May 3, 2024

(65) Prior Publication Data
US 2024/0328835 A1 Oct. 3, 2024

Related U.S. Application Data

(63) Continuation of application No. 18/056,702, filed on Nov. 17, 2022, now Pat. No. 12,000,717, which is a
(Continued)

(51) Int. Cl.
 *G01D 5/347* (2006.01)
 *B41J 11/00* (2006.01)
 (Continued)

(52) U.S. Cl.
 CPC ..... *G01D 5/34738* (2013.01); *G01D 5/34753* (2013.01); *B41J 11/007* (2013.01);
 (Continued)

(58) Field of Classification Search
 CPC ... B41J 11/007; B41J 11/42; B41J 2/01; B41J 3/407; B41J 3/4078; B41J 11/00214; B41J 11/00218; B41J 11/008; B41J 11/0085; B41J 11/46; B41J 13/0009; B41J 15/04; B41J 15/048; B41J 19/202; B41J 19/207; B41J 2/04505; B41J 2/145; B41J 2/2135;
 (Continued)

(56) References Cited

U.S. PATENT DOCUMENTS 4,330,941 A * 5/1982 Haley ............... G01B 5/043
33/776
6,377,774 B1 4/2002 Maul et al.
(Continued)

FOREIGN PATENT DOCUMENTS

WO 2018231189 A1 12/2018

*Primary Examiner* — Georgia Y Epps
*Assistant Examiner* — Monica T Taba
(74) *Attorney, Agent, or Firm* — Perkins Coie LLP

(57) ABSTRACT

A linear rotary encoder includes a pair of rotational surfaces. A contact belt has a first end coupled to a first rotational surface in the pair and a second end coupled to a second rotational surface in the pair. The contact belt is driven to rotate around the pair of rotational surfaces by a driving force applied to media to move the media from the first end toward the second end. An encoding scale is coupled to an inner surface of the contact belt. A reader is positioned to read the encoding scale as the contact belt rotates around the pair of rotational surfaces. The reader generates an output signal indicating a position of the media based on reading of the encoding scale.

17 Claims, 4 Drawing Sheets

Related U.S. Application Data continuation of application No. 16/745,045, filed on Jan. 16, 2020, now Pat. No. 11,525,707.

(51) Int. Cl.
*B41J 11/42* (2006.01)
*B65H 43/08* (2006.01)

(52) U.S. Cl.
CPC ............... *B41J 11/42* (2013.01); *B65H 43/08* (2013.01); *B65H 2511/516* (2013.01); *B65H 2553/51* (2013.01)

(58) Field of Classification Search
CPC .. B41J 2/2146; B41J 2029/3935; B41J 29/06; B41J 29/38; B41J 29/393; B41J 3/4073; B41J 3/543; B65H 2220/01; B65H 2513/10; B65H 2553/51; B65H 2801/06; B65H 2220/02; B65H 2220/03; B65H 2220/11; B65H 2511/11; B65H 2511/222; B65H 2511/51; B65H 2511/512; B65H 2511/516; B65H 2557/23; B65H 2557/33; B65H 29/242; B65H 43/00; B65H 43/08; B65H 5/021; B65H 5/062; B65H 7/02; B65H 7/20; B65G 2203/0291; B65G 2203/044; B65G 23/44; B65G 43/04; G01B 5/043; G01V 8/12; G03G 15/2025; G03G 15/6529; G03G 15/6564; G03G 2215/00409; G03G 2215/00616; G03G 2215/00734; G03G 2215/2093; G09F 19/22; G09F 9/375; H03M 1/1066; H03M 1/308

See application file for complete search history.

(56) References Cited

U.S. PATENT DOCUMENTS

| | | | |
|---|---|---|---|
| 6,407,678 B1 * | 6/2002 | Elgee | H03M 1/1066 400/279 |
| 2004/0080599 A1 * | 4/2004 | Elgee | B41J 19/202 347/104 |
| 2006/0163352 A1 | 7/2006 | Thiessen et al. | |
| 2009/0079999 A1 | 3/2009 | Suzuki | |
| 2010/0239282 A1 | 9/2010 | Ashikawa et al. | |
| 2015/0321473 A1 | 11/2015 | Hernandez et al. | |
| 2017/0015118 A1 | 1/2017 | Tanabe et al. | |
| 2018/0281472 A1 | 10/2018 | Terradellas Callau et al. | |
| 2019/0270320 A1 * | 9/2019 | De Roeck | B41J 3/407 |
| 2020/0062003 A1 | 2/2020 | Levi et al. | |
| 2021/0094323 A1 | 4/2021 | Mizusawa | |
| 2021/0138800 A1 | 5/2021 | Terradellas Callau et al. | |

* cited by examiner

LINEAR ROTARY ENCODER

CROSS-REFERENCE TO RELATED APPLICATION(S)

This application is a continuation of U.S. patent application Ser. No. 18/056,702, filed on Nov. 17, 2022, entitled "LINEAR ROTARY ENCODER," which is a continuation of U.S. patent application Ser. No. 16/745,045, filed on Jan. 16, 2020, entitled "LINEAR ROTARY ENCODER", issued as U.S. Pat. No. 11,525,707, which are incorporated herein by reference in their entireties.

TECHNICAL FIELD

This disclosure relates to a linear rotary encoder.

BACKGROUND

Many mechanical systems use encoders to track motion of the systems' components. Printing systems, for example, use encoders either to track a position of an ink head or printing media within the system. The encoder allows the printing system to track the relative positions of the ink head and media to ensure that a pattern is printed correctly onto the media. The encoders used in mechanical systems are typically either linear encoders, which track position along a line, or rotary encoders, which measure angular distance. However, when used in printing systems in particular, rotary encoders suffer from tolerance stack-ups that reduce measurement precision. Linear encoders have limited practicality in printing systems because media typically moves in one direction through the system, and thus a linear encoder must periodically spring back to a reset position. Accordingly, an encoder that more precisely tracks positions in printing systems is needed.

DETAILED DESCRIPTION

Embodiments of a linear rotary encoder are described herein. In some embodiments, the linear rotary encoder includes a pair of rotational surfaces, such as wheels or bearings. The linear rotary encoder can further include a contact belt that has a first end coupled to a first rotational surface in the pair and a second end coupled to a second rotational surface in the pair. The contact belt can be driven to rotate around the pair of rotational surfaces by a driving force applied to media to move the media from the first end toward the second end. Coupled to an inner surface of the contact belt can be an encoding scale. A reader can be positioned to read the encoding scale as the contact belt rotates around the pair of rotational surfaces. The reader can generate an output signal indicating a position of the media based on reading of the encoding scale.

In some embodiments, the linear rotary encoder can be used in a printer system. The printer system can include a driver configured to drive media through the printer system and one or more print heads configured to deposit ink on the media, in addition to the linear rotary encoder.

Embodiments of the linear rotary encoder are described herein, by way of example, with respect to their use in printing systems. The linear rotary encoder described herein beneficially reduces tolerance stack-ups that occur in purely rotary encoders, while also being usable in a printer with limited space and typically unidirectional linear motion. However, the linear rotary encoder can be used in any of a variety of systems in which information about positions of a mechanical component is needed.

Figure 1:
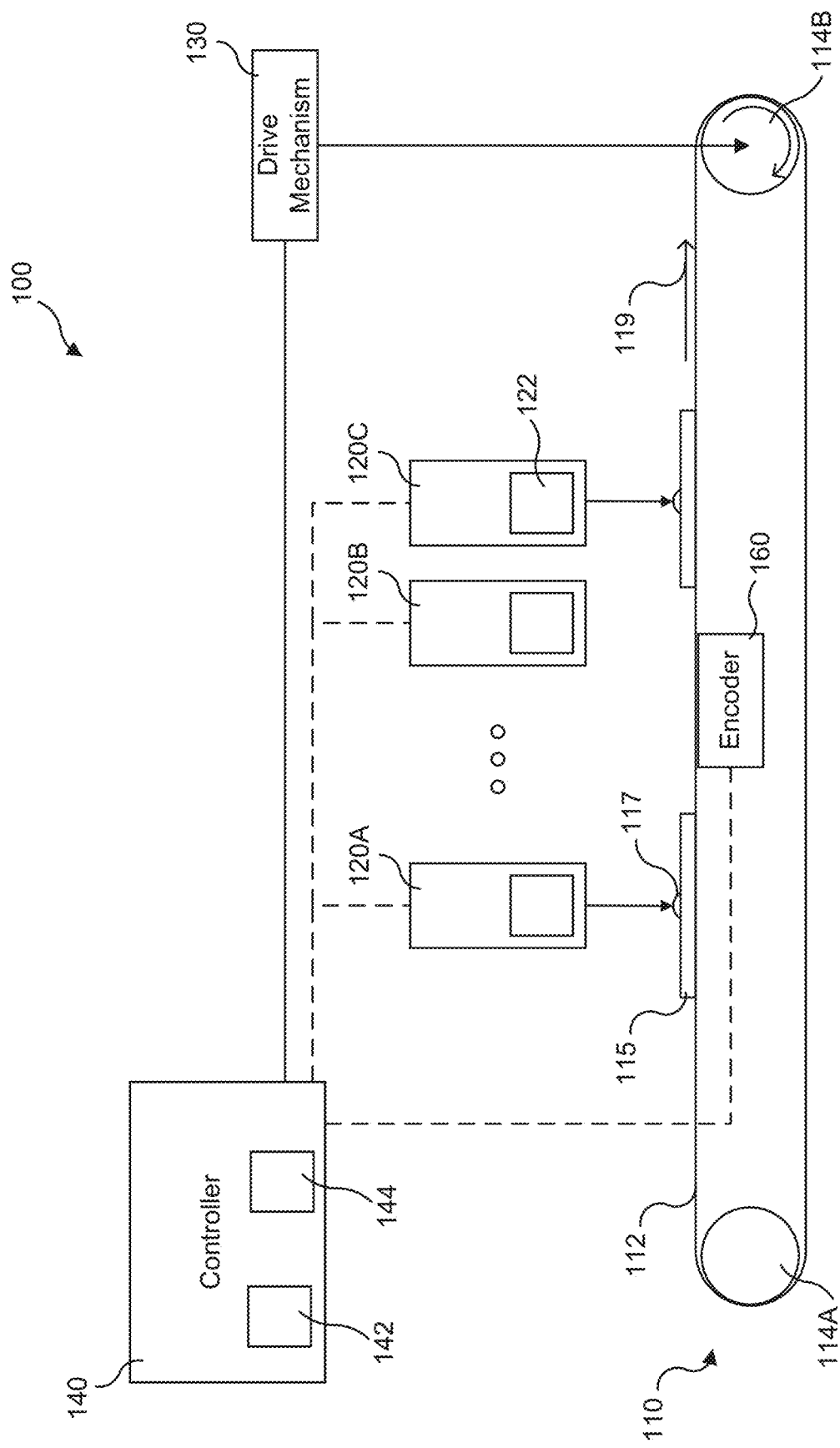
FIG. 1 is a block diagram illustrating components of an example printing system.

FIG. 1 is a block diagram illustrating components of an example printing system 100. The example printing system 100 has a conveyor system 110 for transporting media 115 in relation to one or more print bars 120 (e.g., print bars 120A, 120B, and 120C). The conveyor system 110 can include a driving belt 112 and a pair of rollers 114. The rollers are rotatably mounted on axles (not shown in FIG. 1). One or both rollers 114 can be powered by a drive mechanism 130 to drive movement of the driving belt 112. Specifically, the drive mechanism 130 can controllably rotate a roller 114, such as the roller 114B, to produce movement of the driving belt 112 and thereby move the media 115. In some embodiments, the conveyor system 110 transports the media 115 unidirectionally through the printing system 100, for example moving the media 115 only in a direction 119.

Each of the print bars 120 includes one or more print heads 122. In some embodiments, the print bars 120 are fixedly locked with respect to other components of the printing system 100. As the media 115 is transported in relation to the print bars 120, the print heads 122 deposit ink 117 on the media 115. The ink 117 can be deposited according to any text, images, patterns, or other specified data, and the media can include any substrate including, for example, paper, film, cardboard, tile, or cloth. In some embodiments, the media 115 can be constrained against the driving belt 112 (e.g., by clamps or a vacuum) to flatten the media 115 against the belt 112 or to ensure that the media 115 does not move relative to the belt 112 during the printing process.

A controller 140 controllably powers components of the printing system 100, such as the print bars 120 and drive mechanism 130. The controller 140 can include one or more processors 142 and a storage device 144 (such as memory). In some embodiments, the controller 140 is configured to control any movements and operations in the printing system 100, such as movement of the driving belt 112 through the drive mechanism 130, feeding of media 115 through a feed system (not shown), or the coordinated operations of the printheads 122.

In some embodiments, to print content onto the media 115, the controller 140 receives a print job (e.g., a tagged image file format (TIFF) file). The controller 140 may then produce a raster image that can be divided into separations that are sent to the print bars 120. Based on the separations, a controller or slave computer of each print bar 120 can control its respective print head 122 to print respective colors or other coatings on the media 115.

A linear rotary encoder 160 measures movement of the drive belt 112 through the printing system 100. The encoder 160 generates a signal indicating a position of the belt 112, which can be output to the controller 140 to control the drive mechanism 130 and/or print bars 120 based on the signal. For example, information about the position of the belt 112 output by the encoder 160 can be used as feedback to control the rate at which the drive mechanism 130 drives the driving belt 112. Similarly, the position of the belt 112 can be used to control the position of the print bars 120 to ensure that the print job is printed correctly onto the media 115. The encoder 160 is described further with respect to FIGS. 2A-2B.

The printing system 100 is illustrated by way of example only. The linear rotary encoder 160 according to embodiments described herein may be used in any of a variety of systems that benefit from precise tracking of mechanical components. Furthermore, when the encoder 160 is used in printing systems, these systems may have additional, fewer, or different components than those shown in FIG. 1, or the components may be arranged differently than shown. For example, a printing system may have rollers that directly feed media through the system relative to the print heads, rather than driving the driving belt 112 that in turn carries the media through the system.

Figure 2A:
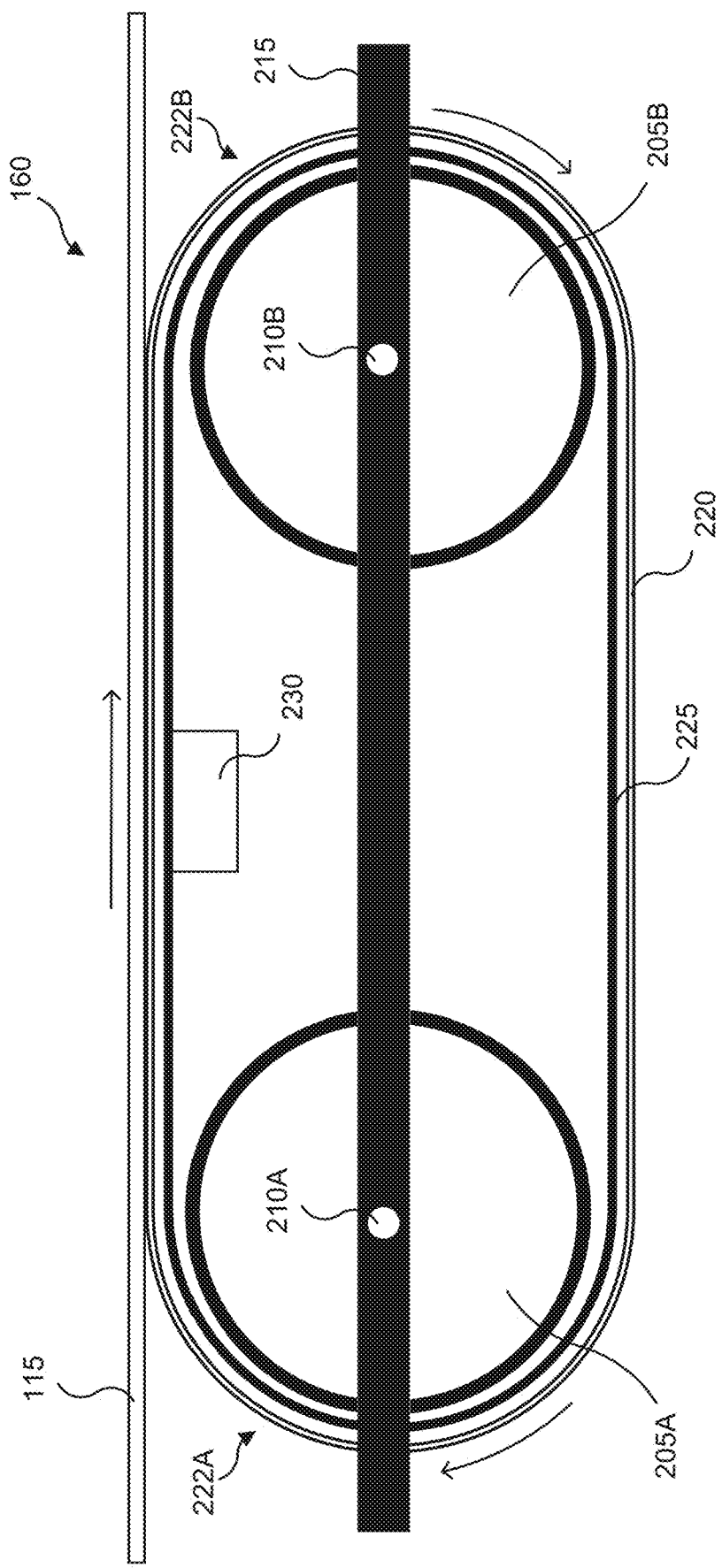
FIGS. 2A-2B illustrate example embodiments of a linear rotary encoder.
Figure 2B:
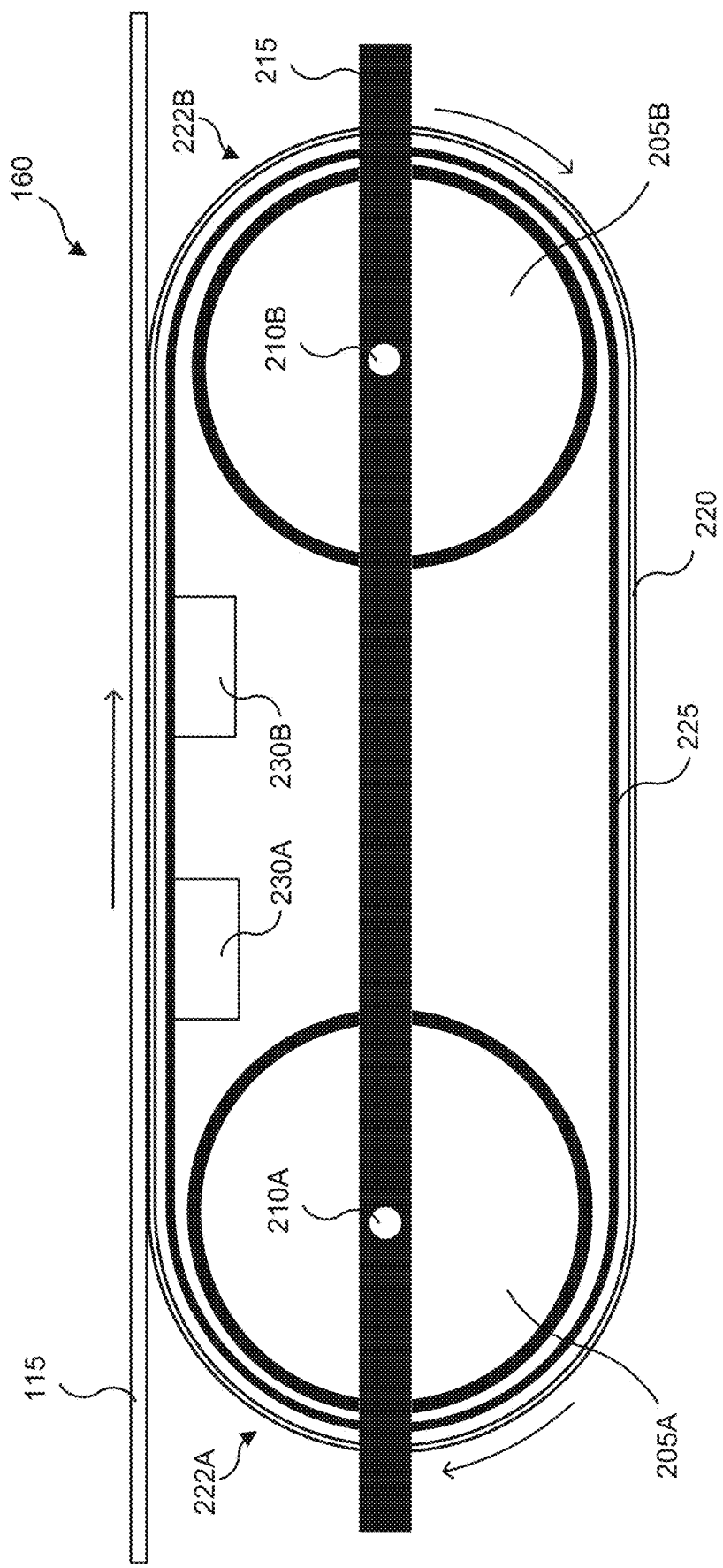

FIGS. 2A-2B illustrate example embodiments of the linear rotary encoder 160. As shown in FIGS. 2A-2B, the encoder 160 can include a pair of rotational surfaces 205 with a first rotational surface 205A and a second rotational surface 205B. In some embodiments, each of the rotational surfaces 205 can be a wheel that is mounted on a corresponding axle 210A, 210B. The axles 210A, 210B may be coupled by a support 215, or each axle 210 may be coupled to an outer casing of the encoder 160 or another structure in the printing system 100 that can support the encoder 160. In other embodiments, the rotational surfaces 205 are bearings. The bearings may be low-friction bearings, such as air bearings, liquid bearings, magnetic bearings, or ball bearings.

The linear rotary encoder 160 can also include a contact belt 220 and an encoding band 225. The contact belt 220 can have a first end 222A coupled to (e.g., partially wrapped around) the first rotational surface 205A, and a second end 222B coupled to (e.g., partially wrapped around) the second rotational surface 205B. The contact belt 220 is rotatable around the rotational surfaces 205, with respect to the axles 210, as media 115 is driven through the printing system 100. In some embodiments, the contact belt 220 makes direct contact with the media 115 (as shown for example in FIG. 2A). However, in other embodiments, the contact belt 220 is instead in contact with the driving belt 112, where the driving belt 112 in turn drives the media 115 through the printing system 100.

Figure 3:
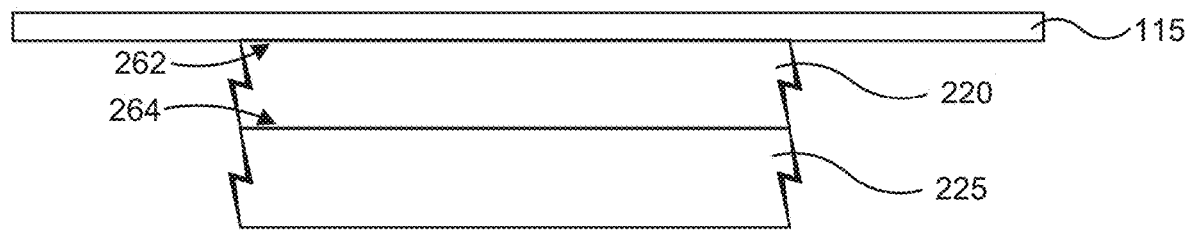
FIG. 3 is a diagram illustrating examples of a contact belt and an encoding band.

FIG. 3 is a diagram showing the contact belt 220 and encoding band 225 in more detail. As shown in FIG. 3, the contact belt 220 can have an outer surface 262 and an inner surface 264. The outer surface 262 can make contact with the media 115, as shown for example in FIG. 3. However, in other embodiments, the outer surface 262 can make contact with the driving belt 112. To ensure that the contact belt 220 does not slide with respect to the media 115, a coefficient of friction between the outer surface 262 and the media 115 (or driving belt 112) can be relatively high. That is, the coefficient of friction can be high enough that the force necessary to overcome the static frictional force between the contact belt 220 and media 115 (i.e., the maximum static frictional force) is greater than a driving force applied transversely to the media 115.

Returning to FIGS. 2A-2B, the encoding band 225 can be positioned between the contact belt 220 and the rotational surfaces 205 and coupled to the inner surface 264 of the contact belt 220. The encoding band 225 can have a scale that is readable by a reader 230 to measure a distance the contact belt 220 has moved. In various embodiments, the encoding band 225 can be a belt that is separate from the contact belt 220 but coupled to the contact belt 220 (e.g., by glue, by one or more fasteners such as brads, tacks, or clamps, or by a high coefficient of friction between the contact belt 220 and the inner surface 264 of the contact belt 220). In other embodiments, the encoding band 225 can be integral to the contact belt 220. For example, the encoding band 225 may be a readable scale printed on the inner surface 264 of the contact belt 220.

At least one of the contact belt 220 and encoding band 225 can have a relatively high bulk stiffness to reduce an amount of expansion or contraction of the belts as they are rotated around the rotational surface 205. Furthermore, each belt 220, 225 may comprise a single material or multiple layers each with different materials. For example, the contact belt 220 may have a first layer of a relatively stiff material to reduce stretching or compression and a second layer at the outer edge 262 of a material (such as rubber) with a high coefficient of friction.

In some embodiments, the rotational surfaces 205 rotate around their respective axles 210. In this case, the contact belt 220 and encoding band 225 do not slide relative to the rotational surfaces 205, but rather cause the rotational surfaces 205 to rotate as the belts are rotated. In addition, a coefficient of friction between each rotational surface 205 and the corresponding axle 210 may be relatively low to ensure that the rotational surfaces 205 rotate freely. For example, the coefficient of friction may be sufficiently low such that a torque applied by the belts to the rotational surface 205 is greater than a counteracting frictional force applied by the axles 210 to the rotational surfaces. In some cases, the rotational surfaces 205 and axles 210 are configured such that the frictional forces are significantly lower than the applied torques, such as by at least an order of magnitude.

In other embodiments, the rotational surfaces 205 are fixedly coupled to the axles 210 and do not rotate around the axles. In these cases, the contact belt 220 and encoding band 225 slide around the rotational surfaces 205. A coefficient of friction between the rotational surfaces 205 and the belts 220, 225 may be low enough that the belts 220, 225 can slide freely without providing significant resistance to tracking the movement of the media 115 through the printing system 100. For example, the coefficient of friction may be sufficiently low such that a driving force applied to drive the belts 220, 225 around the rotational surfaces 205 is greater than a counteracting frictional force applied by the rotational surfaces 205 to the belts 220, 225. The frictional forces can, in some embodiments, be significantly lower, such as by at least an order of magnitude.

In still other embodiments, one rotational surface 205 can be fixed relative to its respective axle 210 while the other rotational surface 205 rotates freely around its axle 210. For example, the contact belt 210 can drive the first rotational surface 205A to rotate with respect to the axle 210A (without the contact belt 210 sliding with respect to the first rotational surface 205A), while the contact belt 210 slides around the second rotational surface 205B that is fixed with respect to the axle 210B.

At least one reader 230 is positioned between the rotational surfaces 205 such that the reader can read encoding scale on the encoding band 225. FIG. 2A shows an example embodiment in which the encoder 160 has a single reader 230, while FIG. 2B shows an example embodiment of an encoder 160 with two readers 230A, 230B. The reader 230 is configured to read the scale on the encoding band 225 to measure a linear distance the encoding band 225 (and correspondingly the media 115) has moved.

Figure 4:
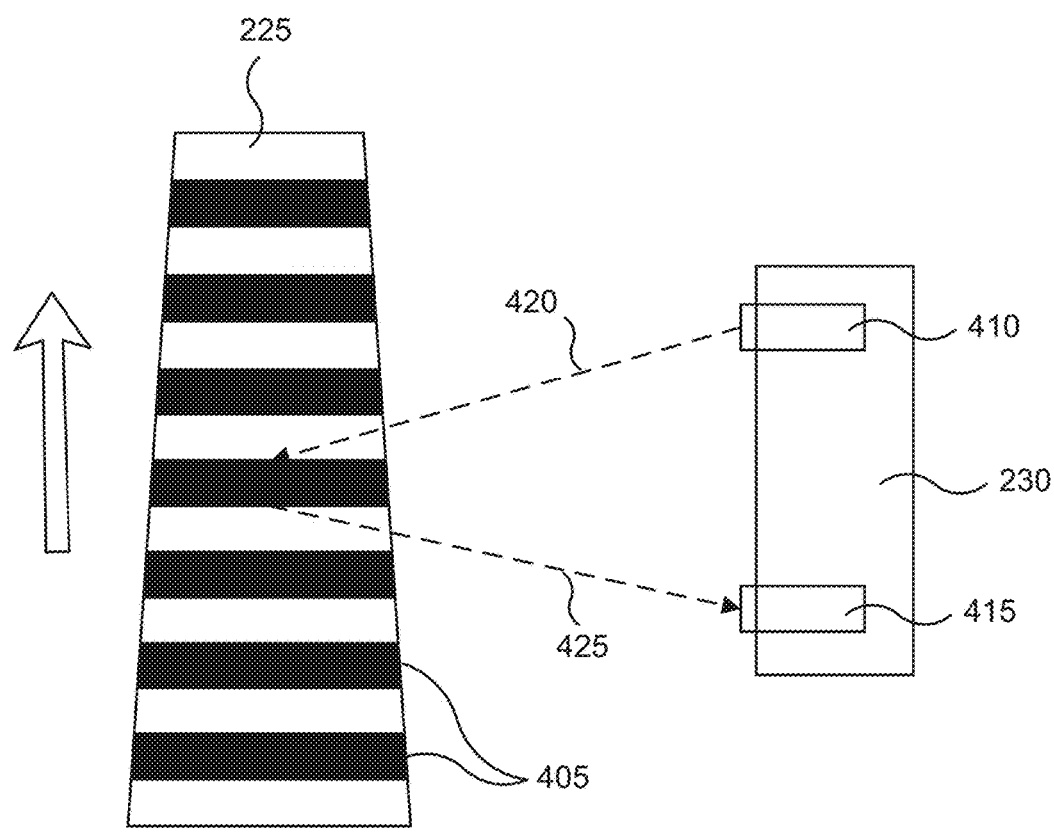
FIG. 4 is a schematic diagram illustrating example operation of a reader.

FIG. 4 is a schematic diagram illustrating example operation of the reader 230. As shown in FIG. 4, the encoding band 225 can have a sequence of scale lines 405 spaced a known, regular distance apart. The reader 230 can include an optical emitter 410 (such as an LED) and an optical detector 415 (such as a photodetector). The optical emitter 410 emits a light signal 420 toward the encoding band 225. The optical detector 415 detects a reflection 425 of the light signal 420. Based on the reflected signal 425, the reader 230 can detect the scale lines 405. The scale lines 405 can be counted as the encoding band 225 moves past the reader, and the number of lines can be converted to a distance using the known spacing between the lines 405. Accordingly, by counting the scale lines 405, a change in position of the media 115 can be measured.

Other embodiments of the reader 230 may be configured to detect distances using methods other than optical measurements. For example, the reader 230 and encoding scale may be magnetic, capacitive, or inductive.

In embodiments where the encoder 160 has multiple readers 230, each reader 230 can output a signal indicating a distance the contact belt 220 has moved. The signals can be compared by the controller 140 to determine the actual distance moved by the contact belt 220. For example, if the encoding band 225 has a seam, gap, or other irregularity that disrupts the encoding scale, the measurement of a single reader 230 may not be accurate while the reader 230 is reading the portion of the scale impacted by the irregularity. Thus, for example, if the controller 140 detects that a first reader's measurements experienced a disruption while a second reader's measurements did not, the controller 140 can use the signal output by the unaffected reader 230 until the disruption has passed the first reader.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A linear rotary encoder system, comprising:
 a contact belt having a first end coupled to a first wheel and a second end coupled to a second wheel,
  wherein the first wheel is fixed relative to a first axle and the second wheel is fixed relative to a second axle to configure the contact belt to slide around the first wheel and the second wheel, and
  wherein the contact belt is driven to rotate around the first wheel and the second wheel by a driving force applied to media to move the media from the first end toward the second end;
 an encoding band having an encoding scale comprising a capacitive element and a sequence of scale lines,
  wherein the encoding band is a belt that is separate from the contact belt, and
  wherein the encoding band is coupled to an inner surface of the contact belt;
 a first reader configured to:
  count the sequence of scale lines of the encoding scale as the contact belt rotates around the first wheel and the second wheel, and
  generate a first output signal indicating a position of the media based on counting the sequence of scale lines;
 a second reader comprising a capacitive sensor corresponding to the capacitive element of the encoding scale,
  wherein the second reader is configured to generate a second output signal indicating the position of the media based on reading the capacitive element by the capacitive sensor; and
 a controller configured to determine the position of the media based on the first output signal and the second output signal.

2. The linear rotary encoder system of claim 1, wherein a maximum static frictional force between the contact belt and the media is greater than the driving force applied to the media.

3. The linear rotary encoder system of claim 1, wherein the first wheel and the second wheel each are caused to rotate around a respective axle by the contact belt.

4. The linear rotary encoder system of claim 1, wherein the first wheel is fixed relative to a first axle,
 wherein the contact belt slides around the first wheel, and
 wherein the contact belt drives the second wheel to rotate with respect to a second axle.

5. The linear rotary encoder system of claim 1, wherein the contact belt slides around the first wheel and the second wheel.

6. The linear rotary encoder system of claim 1, wherein the first reader is positioned between the first wheel and the second wheel.

7. A method performed by a printer system, the method comprising:
 driving, by a driver of the printer system, media through the printer system by applying a driving force to a drive belt of the printer system that supports the media;
 driving, by the driver, a contact belt of the printer system around a first rotational surface of the printer system that is coupled to a first end of the contact belt and a second rotational surface of the printer system that is coupled to a second end of the contact belt,
  wherein the driving force moves the media from the first end toward the second end;
 counting, by a reader of the printer system, a sequence of scale lines of an encoding scale of an encoding band of the printer system as the contact belt rotates around the first rotational surface and the second rotational surface;
 generating, by the reader, an output signal indicative of a position of the media in the printer system based on counting the sequence of scale lines of the encoding scale as the driver drives the media relative to one or more print heads of the printer system that are configured to deposit ink on the media;
 receiving, by a controller of the printer system, the output signal from the reader; and
 controlling, by the controller, the one or more print heads to deposit the ink on the media based on the position of the media.

8. The method of claim 7, comprising:
 reading, by an inductive or capacitive sensor of a second reader of the printer system, an inductive or capacitive element of the encoding scale.

9. The method of claim 8, comprising:
 generating, by the second reader, a second output signal indicative of the position of the media based on reading the inductive or capacitive element.

10. The method of claim 9, comprising:
 determining, by the controller, the position of the media based on the output signal and the second output signal.

11. The method of claim 7, comprising:
receiving, by the controller, a print job; and
producing a raster image based on the print job,
  wherein controlling the one or more print heads is based on the raster image.

12. A controller of a printer system, the controller comprising:
one or more processors configured to:
  cause a driver of the printer system to drive media through the printer system by applying a driving force to a drive belt of the printer system that supports the media;
  cause the driver to drive a contact belt of the printer system around a first rotational surface of the printer system that is coupled to a first end of the contact belt and a second rotational surface of the printer system that is coupled to a second end of the contact belt, wherein the driving force moves the media from the first end toward the second end;
  cause a reader of the printer system to count a sequence of scale lines of an encoding scale of an encoding band of the printer system as the contact belt rotates around the first rotational surface and the second rotational surface; and
  cause the reader to generate an output signal indicative of a position of the media in the printer system based on counting the sequence of scale lines of the encoding scale as the driver drives the media relative to one or more print heads of the printer system that are configured to deposit ink on the media.

13. The controller of claim 12, wherein the one or more processors are configured to:
  receive the output signal from the reader; and
  control the one or more print heads to deposit the ink on the media based on the position of the media.

14. The controller of claim 13, wherein the one or more processors are configured to:
  receive a print job; and
  produce a raster image based on the print job,
    wherein controlling the one or more print heads is based on the raster image.

15. The controller of claim 12, wherein the one or more processors are configured to:
  cause an inductive or capacitive sensor of a second reader of the printer system to read an inductive or capacitive element of the encoding scale.

16. The controller of claim 15, wherein the one or more processors are configured to:
  cause the second reader to generate a second output signal indicative of the position of the media based on reading the inductive or capacitive element.

17. The controller of claim 16, wherein the one or more processors are configured to:
  determine the position of the media based on the output signal and the second output signal.

\* \* \* \* \*